(12) United States Patent
Sharma et al.

(10) Patent No.: US 12,691,823 B2
(45) Date of Patent: Jul. 28, 2026

(54) SIDEVIEW MIRROR SYSTEM FOR A VEHICLE

(71) Applicant: GM GLOBAL TECHNOLOGY OPERATIONS LLC, Detroit, MI (US)

(72) Inventors: Manoj K. Sharma, Troy, MI (US); Jonglee Park, Novi, MI (US); Julien P. Mourou, Bloomfield Hills, MI (US); Charles R. Quinn, Pleasant Ridge, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 18/938,497

(22) Filed: Nov. 6, 2024

(65) Prior Publication Data

US 2026/0124990 A1     May 7, 2026

(51) Int. Cl.
  B60R 1/12      (2006.01)
  B60R 1/28      (2022.01)

(52) U.S. Cl.
  CPC .................. B60R 1/12 (2013.01); B60R 1/28 (2022.01); *B60R 2001/1253* (2013.01)

(58) Field of Classification Search
  CPC ................ C01F 1/00; G01N 33/56966; G01N 33/6854; G01N 33/582; G01N 1/30; G01N 33/573; C12Q 1/68
  See application file for complete search history.

(56) References Cited

U.S. PATENT DOCUMENTS

| | | | |
|---|---|---|---|
| 2015/0077281 A1* | 3/2015 | Taniguchi ............. | G01S 15/876 348/148 |
| 2015/0224933 A1* | 8/2015 | Higgins-Luthman ..... | B60R 1/12 348/118 |
| 2017/0374340 A1* | 12/2017 | Pflug .................... | H04N 13/106 |
| 2022/0230456 A1* | 7/2022 | Kasarla .................. | G06F 3/013 |
| 2024/0064274 A1* | 2/2024 | Blank ...................... | B60R 1/25 |

FOREIGN PATENT DOCUMENTS

| | | |
|---|---|---|
| DE | 102007044535 B4 | 3/2008 |
| DE | 102013020950 A1 | 6/2015 |
| DE | 102023002197 A1 | 11/2023 |

* cited by examiner

*Primary Examiner* — Neil R Mikeska
(74) *Attorney, Agent, or Firm* — Quinn IP Law

(57)     ABSTRACT

An on-vehicle rearview-focused camera is arranged to monitor a field of view that is rearward of the vehicle. The operator monitoring device is arranged to dynamically monitor an eye gaze of an operator. The controller is in communication with a digital display screen, the rearview camera, and the operator monitoring device. The controller includes executable code that is operative to: capture, via the camera, an image of the rearward field of view of the vehicle; determine, via the operator monitoring device, a direction of the eye gaze of the operator; determine an operating mode; and display, via the digital display screen, a portion of the image of the rearward field of view, wherein the portion of the image of the rearward field of view is determined based upon the operating mode and the direction of the eye gaze of the operator.

20 Claims, 5 Drawing Sheets

SIDEVIEW MIRROR SYSTEM FOR A VEHICLE

INTRODUCTION

Vehicles are equipped with side-view mirrors, which may be employed by vehicle operators to visually monitor rearward areas that are behind, to the left, and to the right of the vehicle. Such monitoring may be useful under various traffic conditions, including but not limited to lane changes, merges, exits, during turns at intersections, etc. Such monitoring may also be useful when backing a vehicle, i.e., operating in a reverse direction of travel.

SUMMARY

There is a need to be able to determine a parameter related to a direction of a vehicle operator's eye gaze, and display, on a proximal digital screen, an image that is derived from a field of view (FOV) rearward of the vehicle based thereon. This is accomplished to provide visual information to the operator that is useful in operating the vehicle.

The concepts described herein include a method, system, and/or apparatus that are arranged and configured to provide a side-view mirror system for a vehicle that includes a rearview-focused camera, a device for determining a direction of an operator's eye gaze, a digital display screen, and a controller that is capable of dynamically monitoring a field of view (FOV) that is rearward of the vehicle, and selecting a portion of the FOV that is displayed as an image on the digital display screen based at least in part upon the direction of the operator's eye gaze.

An aspect of the disclosure may include an on-vehicle rearview-focused camera that is arranged to monitor a field of view that is rearward of the vehicle. The operator monitoring device is arranged to dynamically monitor an eye gaze of an operator. The controller is in communication with a digital display screen, the rearview camera, and the operator monitoring device. The controller includes executable code that is operative to: capture, via the camera, an image of the rearward field of view of the vehicle; determine, via the operator monitoring device, a direction of the eye gaze of the operator; determine an operating mode; and display, via the digital display screen, a portion of the image of the rearward field of view, wherein the portion of the image of the rearward field of view is determined based upon the operating mode and the direction of the eye gaze of the operator.

Another aspect of the disclosure may include a side-view mirror system for a vehicle that includes a rearview-focused camera, with the rearview-focused camera being disposed on a side of a vehicle and being arranged to capture a field of view that is rearward of the vehicle; an operator monitoring device, arranged to dynamically determine a direction of the eye gaze of an operator; a digital display screen; and a controller. The controller is in communication with the digital display device, the rearview camera, and the operator monitoring device. The controller includes executable code that is operative to: capture, via the camera, an image of the field of view that is rearward of the vehicle; detect, via the operator monitoring device, a present direction of the eye gaze of the operator; determine an operating mode, and display, via the digital display screen, a portion of the image of the field of view that is rearward of the vehicle, wherein the portion of the image of the field of view is determined based upon the operating mode and the present direction of the eye gaze of the operator.

Another aspect of the disclosure may include the operating mode being one of a mirror-like view, a hazard-based view, or a region of interest-based view.

Another aspect of the disclosure may include a displayed portion of the image of the field of view that is being determined based upon the operating mode and the present direction of the eye gaze of the operator, which includes image augmentation that includes an on-road hazard being highlighted when the hazard-based view is selected.

Another aspect of the disclosure may include a displayed portion of the image of the field of view being determined based upon the operating mode and the present direction of the eye gaze of the operator, which includes image augmentation wherein a region of interest is highlighted when the region of interest-based view is selected.

Another aspect of the disclosure may include the operating mode being one of an extended view, an augmented hazard view, or an extended hazard augmented view.

Another aspect of the disclosure may include the controller determining the operating mode based upon an operator preference.

Another aspect of the disclosure may include the operator monitoring device being a device that is arranged to determine a position of a head of the operator to determine the direction of the eye gaze of the operator.

Another aspect of the disclosure may include the rearview-focused camera being disposed on an exterior side surface of the vehicle proximal to a side-view mirror.

Another aspect of the disclosure may include the rearview-focused camera being disposed on a left exterior side surface of the vehicle proximal to a left side-view mirror.

Another aspect of the disclosure may include the rearview-focused camera being disposed on a right exterior side surface of the vehicle proximal to a right side-view mirror.

Another aspect of the disclosure may include the controller determining the operating mode based upon an operator region of interest.

Another aspect of the disclosure may include the controller determining the operating mode based upon presence of a hazard proximal to the vehicle.

Another aspect of the disclosure may include the controller being operative to execute an image distortion correction of the image of the rearward field of view prior to displaying, via the digital display device, the portion of the image of the rearward field of view.

Another aspect of the disclosure may include the controller being operative to detect a reverse operation of the vehicle, and display, via the digital display screen, a portion of the image of the field of view that is rearward of the vehicle, wherein the portion of the image of the field of view is determined based upon the operating mode, the present direction of the eye gaze of the operator, and the reverse operation of the vehicle.

Another aspect of the disclosure may include side-view mirror system for a vehicle that includes: a rearview-focused camera, with the rearview-focused camera being disposed on a side of a vehicle and being arranged to capture a field of view that is rearward of the vehicle; a passenger compartment, including an operator seat, an operator monitoring device arranged to monitor an operator disposed in the operator seat, and a display screen viewable by the operator; and a controller, in communication with the display device, the rearview camera, and the operator monitoring device. The controller includes executable code, the executable code being operative to: capture, via the camera, an image of the field of view that is rearward of the vehicle, detect, via the operator monitoring device, a present direction of the eye gaze of the operator disposed in the operator seat, determine an operating mode, and display, via the digital display screen, a portion of the image of the field of view that is rearward of the vehicle, wherein the portion of the image of the field of view is determined based upon the operating mode and the present direction of the eye gaze of the operator.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
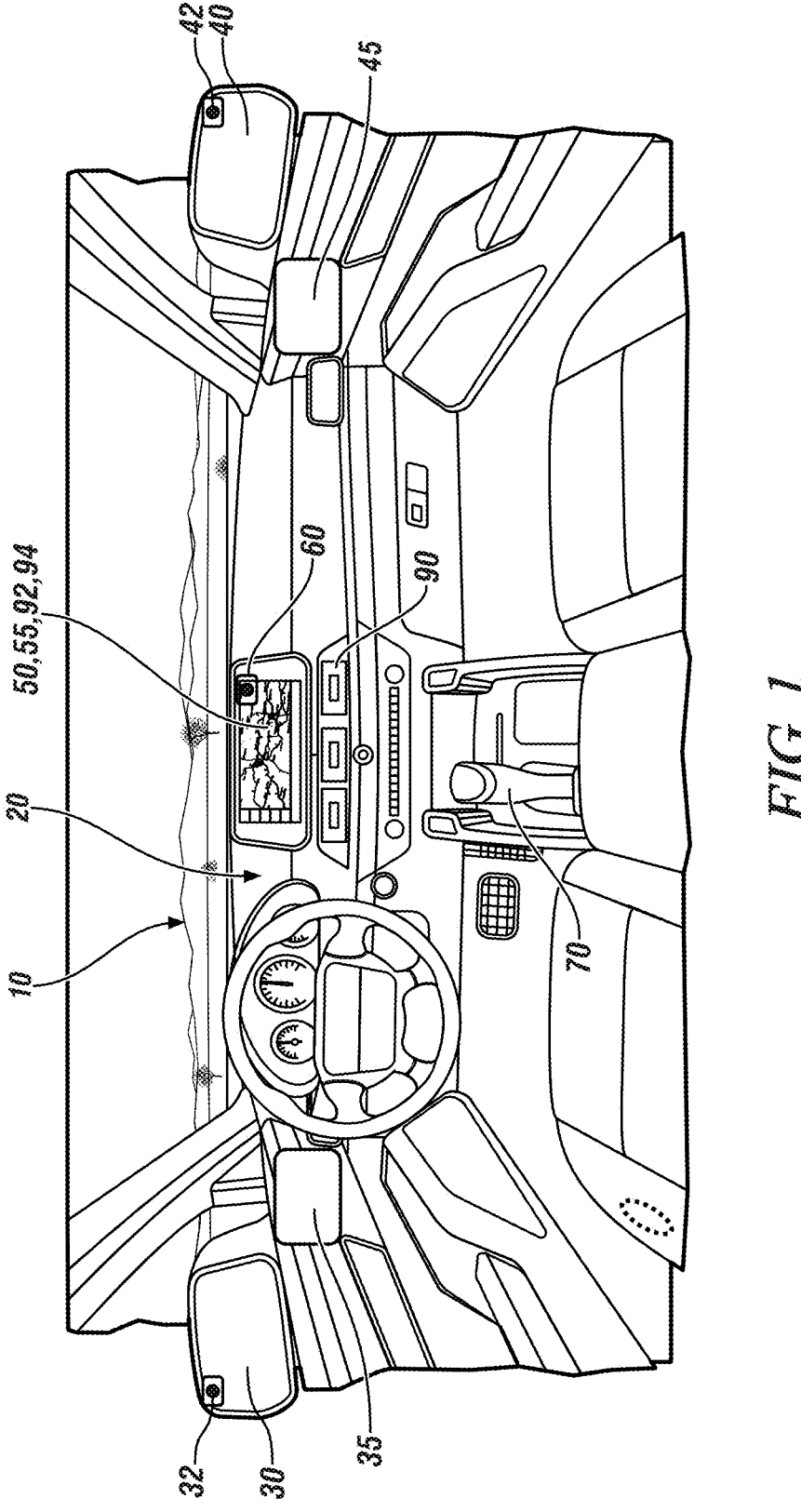
FIG. 1 schematically illustrates an embodiment of a forward-facing portion of a passenger cabin for an embodiment of a subject vehicle, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure.

Furthermore, directional terms such as top, bottom, left, right, up, over, above, below, beneath, rear, and front, may be used when referring to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely illustrative in nature and is not intended to limit the application and uses. Furthermore, there is no intention to be bound by any expressed or implied theory presented herein. Throughout the drawings, corresponding reference numerals indicate like or corresponding parts and features.

As employed herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

As employed herein, the term "operatively connected" indicates a relationship in which one element operates or otherwise controls actuation of another element employing one or a combination of mechanical, fluidic electrical, electronic, magnetic, digital, etc., forces to perform one or multiple tasks.

The use of ordinals such as first, second and third does not necessarily imply a ranked sense of order, but rather may only distinguish between multiple instances of an act or structure.

Referring to the drawings, wherein like reference numerals correspond to like or similar components throughout the several Figures, FIG. 1 pictorially illustrates an embodiment of a forward-facing portion of a passenger cabin 20 for an embodiment of a vehicle 10 that includes a side-view mirror system 15 that is capable of implementing and executing an embodiment of a rearview image generation process 200 that is illustrated and described with reference to FIGS. 2, et seq., in accordance with the disclosure. The vehicle 10 is disposed on and able to traverse a travel surface such as a paved road surface, in one embodiment. The concepts described herein may be arranged on a multitude of different land, air, and sea vehicle types, including but not limited to passenger vehicles, light-duty trucks, tractor-trailers, recreational vehicles, construction vehicles, agricultural vehicles including tractors, combines, etc., boats, ships, airplanes, two-wheeled vehicles, utility vehicles, and others, without exception.

By way of one non-limiting example, an embodiment of the side-view mirror system 15 with rearview image generation process 200 may be executed on a passenger vehicle to monitor traffic on a highway. By way of another non-limiting example, an embodiment of side-view mirror system 15 with the rearview image generation process 200 may be executed to monitor alignment of a grain cart that is traveling beside a combine harvester. In some embodiments, the side-view mirror system 15 may be referred to as a digital side-view mirror system.

Referring again to FIG. 1, the vehicle 10 includes, in one embodiment, the passenger cabin 20 having a side-view mirror system 15 with controller 80. The side-view mirror system 15 includes an externally mounted left or operator's-side side-view mirror 30, an externally mounted right or passenger's-side side-view mirror 40, a first, leftward display screen 35, a second, rightward display screen 45, an operator information center 50 including a touchscreen 55, a biometric monitoring system 60, transmission range selector 70, and other elements. The left side-view mirror 30 has a first digital camera system 32 mounted thereon, and the right side-view mirror 40 includes a second digital camera system 42 mounted thereon. It is appreciated that in some embodiments, the left side-view mirror 30 may be associated with and correspond to a passenger's-side of the vehicle, and a right side-view mirror 40 may be associated
with and correspond to an operator's-side of the vehicle 10.
It is appreciated that in some embodiments the vehicle 10 is
arranged with an operator seat and lacks a passenger seat. It
is appreciated that in some embodiments, the operator's seat
is centrally mounted.

The first digital camera system 32 and the second digital
camera system 42 may be configured with two-dimensional
imaging capability, three-dimensional imaging capability,
black-and-white imaging capability, RGB color imaging
capability, etc. The first digital camera system 32 and the
second digital camera system 42 may utilize fish-eye lens to
maximize the reach of their respective FOVs, or another lens
type. The first digital camera system 32 and the second
digital camera system 42 may have a pixelated resolution of
2 megapixels, or another resolution, without limitation.

The first digital camera system 32 and the second digital
camera system 42, the operator information center 50
including touchscreen 55, the first, leftward display screen
35, and the second, rightward display screen 45, the bio-
metric monitoring system 60 and the transmission range
selector 70 are in communication with and/or operatively
connected to the controller 80, which includes executable
code to monitor and process information therefrom, and
display images on the first and second display screens 35,
45.

The first and second display screens 35, 45 are depicted
as being interior to the vehicle 10, in the corresponding
operator's door or passenger's door, below the respective
operator's side side-view mirror 30 or passenger's-side
side-view mirror 40. It is appreciated that the first and
second display screens 35, 45 may instead be arranged on
the corresponding operator's door or passenger's door in a
plane that is horizontal to the respective operator's-side
side-view mirror 30 or passenger's-side side-view mirror 40,
or at another location that is readily viewed by the operator.

In one embodiment, the first and second display screens
35, 45 may instead be arranged on an internal portion of a
roof support structure on either side of the vehicle's wind-
shield, i.e., an A pillar. Alternatively, the first and second
display screens 35, 45 may be head up displays (HUDs) that
are projected onto portions of the windows of the corre-
sponding operator's door or passenger's door. Furthermore,
the first and second display screens 35, 45 are depicted as
accompanying the respective operator's-side side-view mir-
ror 30 and passenger's-side side-view mirror 40 in FIG. 1.
In one embodiment, first and second display screens 35, 45
may supplant the respective operator's-side side-view mir-
ror 30 and passenger's-side side-view mirror 40, with the
operator's-side side-view mirror 30 and/or passenger's-side
side-view mirror 40 being absent from an embodiment of the
vehicle 10.

The operator information center (DIC) 50 includes a
touchscreen 55, and provides for human/machine interac-
tion, for purposes of directing operation of an infotainment
system, a navigation system, and the like.

The operator information center 50 may also communi-
cate with one or more devices that monitor biometric
monitoring devices 60 to determine data associated with the
vehicle operator, including, e.g., eye gaze direction, posture,
and head position tracking, among others. The operator
information center 50 is depicted as a unitary device for ease
of description, but may be configured as a plurality of
controllers and associated sensing devices in an embodiment
of the system described herein.

The biometric monitoring system 60 is arranged in-
vehicle to a direction of the eye gaze of the operator, or a biometric equivalent. The term "eye gaze" refers to the
alignment of an individual's eyes towards a specific focus
area/region. In one embodiment, the biometric monitoring
system 60 monitors parameters related to a location and
angle of an operator's head, which can be calibrated and
translated to determine a direction of an operator's eye gaze.
Alternatively, or in addition, the biometric monitoring sys-
tem 60 may be configured to monitor and track the eye(s) of
the operator. The biometric monitoring system 60 may be
employed to dynamically determine the direction of the eye
gaze of the operator, whether forward-gazing, left-side mir-
ror gazing, right-side mirror gazing, instrument panel gaz-
ing, operator information center gazing, etc.

In one embodiment, the spatial monitoring system 94
includes one or a plurality of spatial sensors and systems that
are arranged to monitor regions that are proximal to the
subject vehicle 10, and a spatial monitoring controller. The
spatial sensors that are arranged to monitor the viewable
region include, e.g., a lidar sensor, a radar sensor, a digital
camera, or another device. Each of the spatial sensors is
disposed on-vehicle to monitor all or a portion of the
viewable region to detect proximate remote objects such as
road features, lane markers, buildings, pedestrians, road
signs, traffic control lights and signs, other vehicles, road
hazards, and geographic features that are proximal to the
subject vehicle 10. The spatial monitoring controller may
generate digital representations of the viewable region based
upon data inputs from the spatial sensors. The spatial
monitoring controller includes executable code to evaluate
inputs from the spatial sensors to determine a linear range,
relative speed, and trajectory of the subject vehicle 10 in
view of each proximate remote object. The spatial sensors
can be located at various locations on the subject vehicle 10
including the front corners, rear corners, rear sides and
mid-sides. The spatial sensors can include a front radar
sensor and a camera in one embodiment, although the
disclosure is not so limited.

Placement of the spatial sensors are selected to permit the
spatial monitoring controller to monitor traffic flow includ-
ing proximate vehicles, intersections, lane markers, and
other objects around the subject vehicle 10. The spatial
sensors of the spatial monitoring system 94 may include
object-locating sensing devices including range sensors,
such as FM-CW (Frequency Modulated Continuous Wave)
radars, pulse and FSK (Frequency Shift Keying) radars, and
LiDAR (Light Detection and Ranging) devices, and ultra-
sonic devices which rely upon effects such as Doppler-effect
measurements to locate forward objects. The possible
object-locating devices include charged-coupled devices
(CCD) or complementary metal oxide semi-conductor
(CMOS) video image sensors, and other camera/video
image processors which utilize digital photographic meth-
ods to 'view' forward objects including one or more
vehicle(s).

The term "controller" and related terms such as micro-
controller, control unit, processor and similar terms refer to
one or various combinations of Application Specific Inte-
grated Circuit(s) (ASIC), Field-Programmable Gate Array
(FPGA), electronic circuit(s), central processing unit(s),
e.g., microprocessor(s) and associated non-transitory
memory component(s) in the form of memory and storage
devices (read only, programmable read only, random access,
hard drive, etc.). The non-transitory memory component
stores machine readable instructions in the form of one or
more software or firmware programs or routines, combina-
tional logic circuit(s), input/output circuit(s) and devices,
signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event.

Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals vian optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, which is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
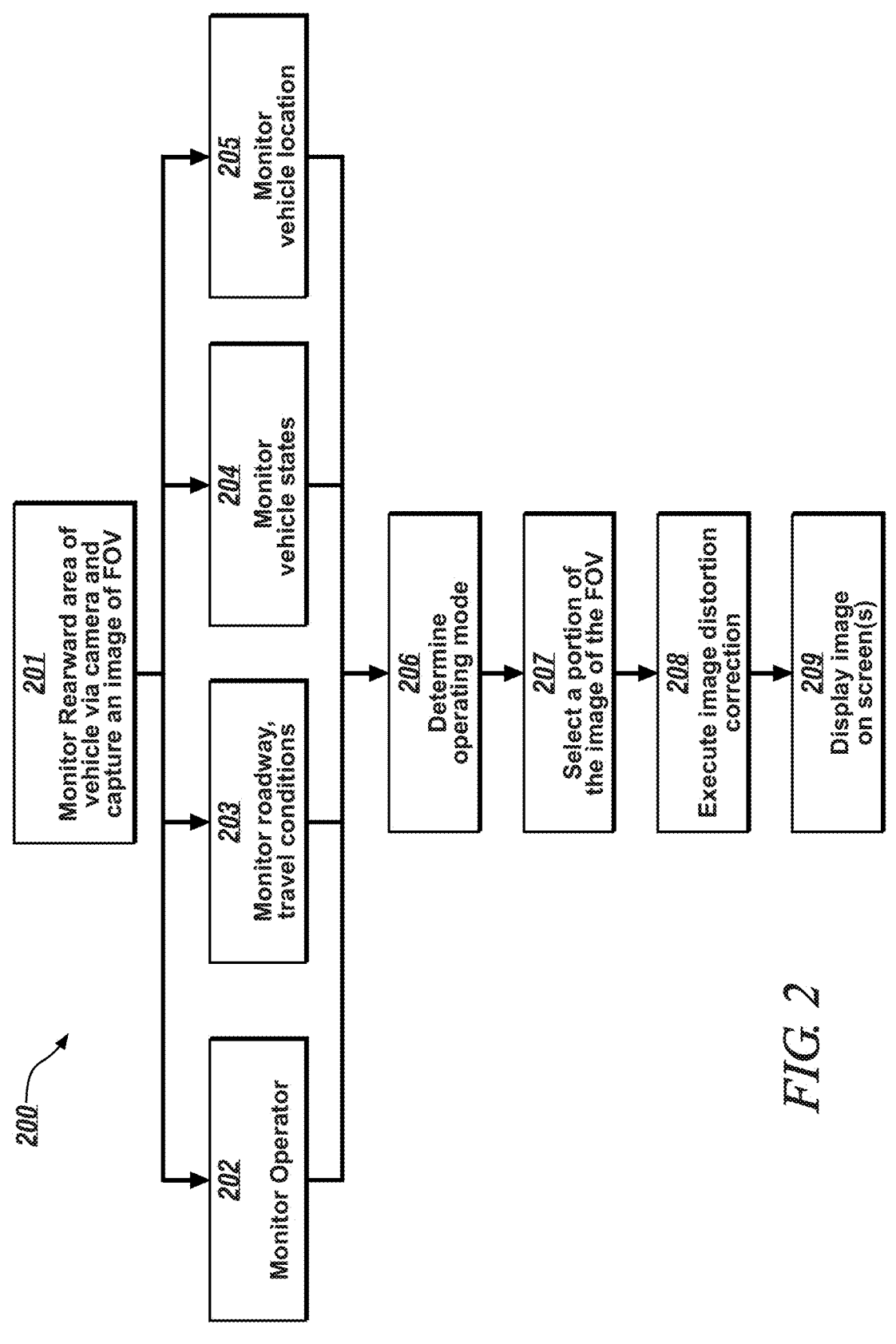
FIG. 2 schematically illustrates a rearview image generation process, in accordance with the disclosure, FIG. 3 schematically illustrates a top view of a passenger compartment of a vehicle having an embodiment of a side-view mirror system, in accordance with the disclosure.

FIG. 2 schematically illustrates an embodiment of a rearview image generation process 200 that is executable by the controller 80 that is described with reference to FIG. 1, to capture and display an image of at least a portion of the rearward field of view of the vehicle that is responsive to the vehicle operator's gaze while accounting for the present operating environment, which may include traffic, roadway states such as intersections and lane merges, vehicle navigation, direction of travel (forward or reverse), among others.

The rearview image generation process 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the rearview image generation process 200 is described with reference to the vehicle 10 that is described with reference to FIG. 1.

TABLE 1

| BLOCK | BLOCK CONTENTS |
|---|---|
| 201 | Monitor rearward area of vehicle via camera and capture image of field of view (FOV) |
| 202 | Monitor operator |
| 203 | Monitor roadway, travel conditions |
| 204 | Monitor vehicle states |
| 205 | Monitor vehicle location |
| 206 | Determine operating mode |
| 207 | Select a portion of the image of the FOV |
| 208 | Execute image distortion correction |
| 209 | Display image on screen |

Execution of the rearview image generation process (process) 200 may proceed as follows. The steps of the process 200 may be regularly or periodically executed in a suitable order, and are not limited to the order described with reference to FIG. 2.

The rearview image generation process 200 includes regularly, periodically, and ongoingly monitoring a rearward area of the vehicle 10 via the first and/or second digital cameras 32, 42, and capturing image(s) of the field(s) of view (FOV) (Step 201). In one embodiment, this may include capturing an image of a FOV via the first digital camera 32. In one embodiment, this may include capturing an image of a FOV via the second digital camera 42. In one embodiment, this may include capturing a first image of a first FOV via the first digital camera 32, capturing a second image of a second FOV via the second digital camera, and executing fusion of the first image and the second image to derive a final image that is processed as described herein.

Coincidently, the biometric monitoring system 60 monitors the operator to capture information related to a direction of the operator's eye gaze, e.g., whether the operator is looking or glancing towards one of the left or right side-view mirrors 30, 40, whether the operator is looking or glancing towards a center-mounted rearview mirror, etc. (Step 202). This may include capturing the head position of the operator.

Coincidently, roadway and travel conditions may be monitored, via image processing from the first and/or second digital cameras 32, 42, augmented by roadway and travel conditions information captured from the navigation system 92, the spatial monitoring system 94 (on vehicles so equipped), and/or other on-vehicle or off-vehicle systems (Step 203). This includes monitoring the surrounding areas of the subject vehicle 10 to detect proximate vehicles, remote objects such as road features, lane markers, buildings, pedestrians, road signs, traffic control lights and signs, road hazards, and geographic features. Furthermore, the navigation system 92 may be employed to monitor travel lanes, including but not limited to lane changes, merges, exits, etc. This may also include traffic levels, travel conditions, etc. This information may be augmented with other information available for proximal vehicles via vehicle-to-vehicle communication (V2V), connected highway systems, satellite communications, etc., without limitation.

One or a plurality of vehicle states are monitored, including, but not limited to the operator-requested direction of travel via the transmission range selector 70, i.e., a reverse operation, and activation of an ADAS system, etc. (Step 204).

Location of the subject vehicle 10 is monitored via the GPS sensor (Step 205).

The foregoing information that is captured in Steps 201 through 205 is employed to determine a side-view mirror (SVM) operating mode for the subject vehicle (Step 206). The SVM operating mode may include a Mirror-like View (MODE 1), a Hazard Based view (MODE 2), a region of interest (ROI) based view (MODE 3), an augmented-hazard-based view (MODE 4), an extended view (MODE 5), and an extended hazard augmented view (MODE 6). One or more of these modes can be automatically selected based on the operator preference in different driving conditions, e.g., selecting MODE 4 when operating on a highway, or MODE 2 when operating on a rural crowded road. In one embodiment, a machine learning algorithm may be used to classify the driving conditions and select an appropriate mode based thereon.

A portion of the image of the field of view (FOV) that is captured in step 201 is selected based upon the selected operating mode and the direction or location of the operator's eye gaze (Step 207).

An image distortion correction routine is executed on the selected portion of the image of the field of view (FOV) (Step 208). Routines capable of image distortion correction are commercially available, and thus not described in detail herein.

The resulting image of the portion of the field of view (FOV) with image distortion correction is projected onto the relevant display screen, i.e., either or both the first, leftward display screen 35 and/or the second, rightward display screen 45 (Step 209).

In one embodiment, the projected image of the portion of field of view (FOV) with image distortion correction may have supplemental information, including an augmented reality that may include lane location(s), vehicle path, directional and/or navigational information, and the like.

Preferably, and in one embodiment, the steps of this process are executed at a rate of 30, 50, 60 or other quantity of frames per second.

The rearview image generation process 200 of FIG. 2 is executed as algorithmic code in the controller 80. The rearview image generation process 200 may be implemented through a computer algorithm, machine executable code, non-transitory computer-readable medium, or software instructions programmed into the vehicle. Although the various steps shown in the flowchart diagram appear to occur in a chronological sequence, at least some of the steps may occur in a different order, and some steps may be performed concurrently or not at all.

Figure 3:
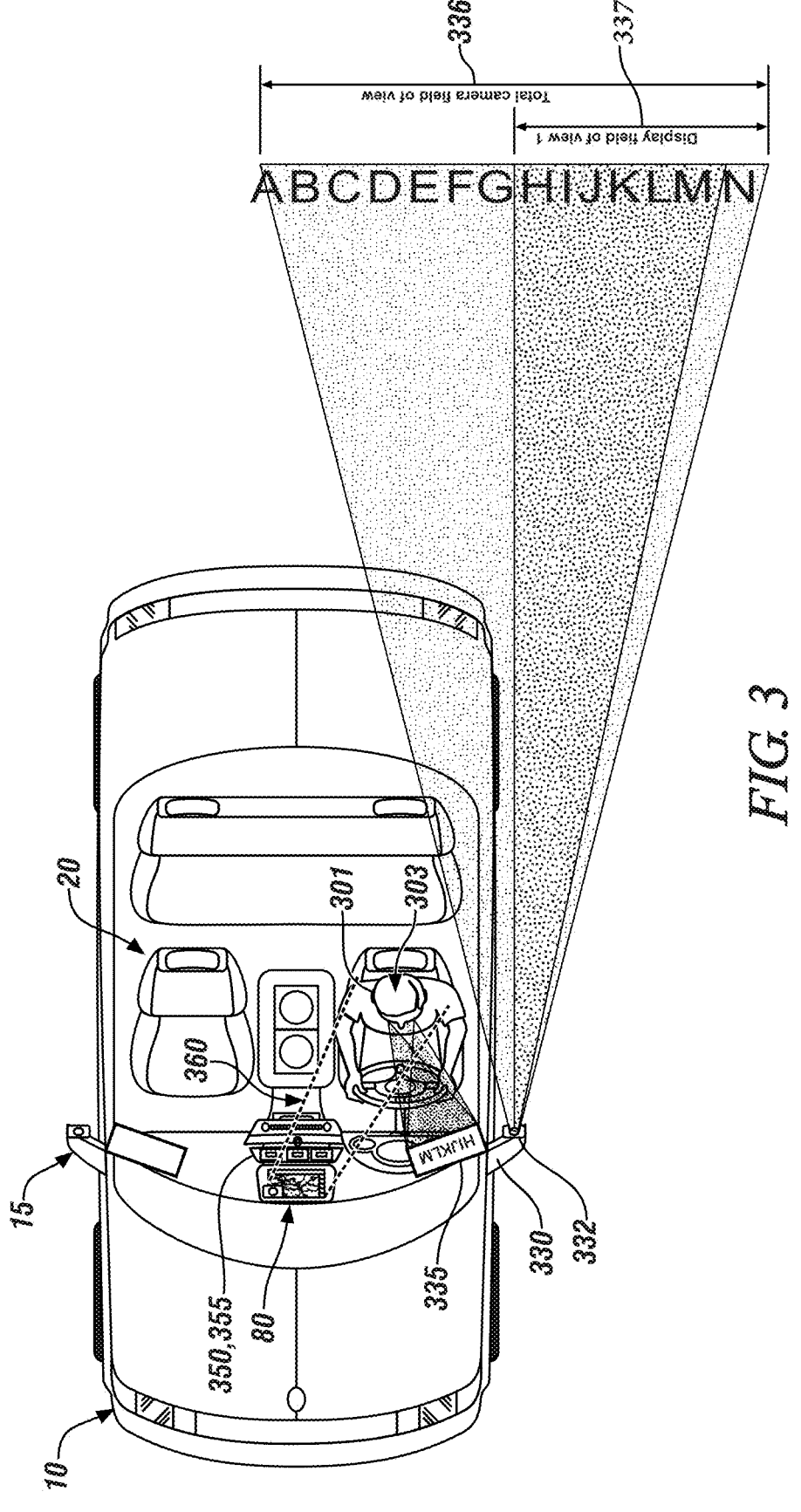

FIG. 3 schematically illustrates a top view of a passenger compartment of a vehicle 310 having an embodiment of a side-view mirror system 315, including an operator 301 who is arranged on a left side of the vehicle 310.

The vehicle 10 includes, in one embodiment, the passenger cabin 20 with an externally mounted left or operator's-side side-view mirror 330 with first digital camera system 332, an externally mounted right or passenger's-side side-view mirror 340 with second digital camera system 342, a first, leftward display screen 335, a second, rightward display screen 345, an operator information center 350 including a display screen 355, a biometric monitoring system 360, and other elements. In this embodiment, the direction of the operator's eye gaze, as indicated by a first head position 303, is shown as being rightward, which may be interpreted as indicating the operator is on a highway.

A total FOV 336 for the first digital camera system 332 is shown as having a triangular shape (in 2 dimension), or a pyramidic or conic shape (in 3 dimension), and is depicted to include subregions ABCDEFGHIJKLMN. Based upon the operation of the rearview image generation process 200 described with reference to FIG. 2, a first portion 337 of the total FOV 336 may be selected based upon the operator 301 having the first, rightward head position 303. By way of a non-limiting example, the first portion 337 of the total FOV 336 may be circumscribed to include subregions HIJKLM, with only subregions HIJKLM being displayed on the first, leftward display screen 335, as illustrated.

Figure 4:
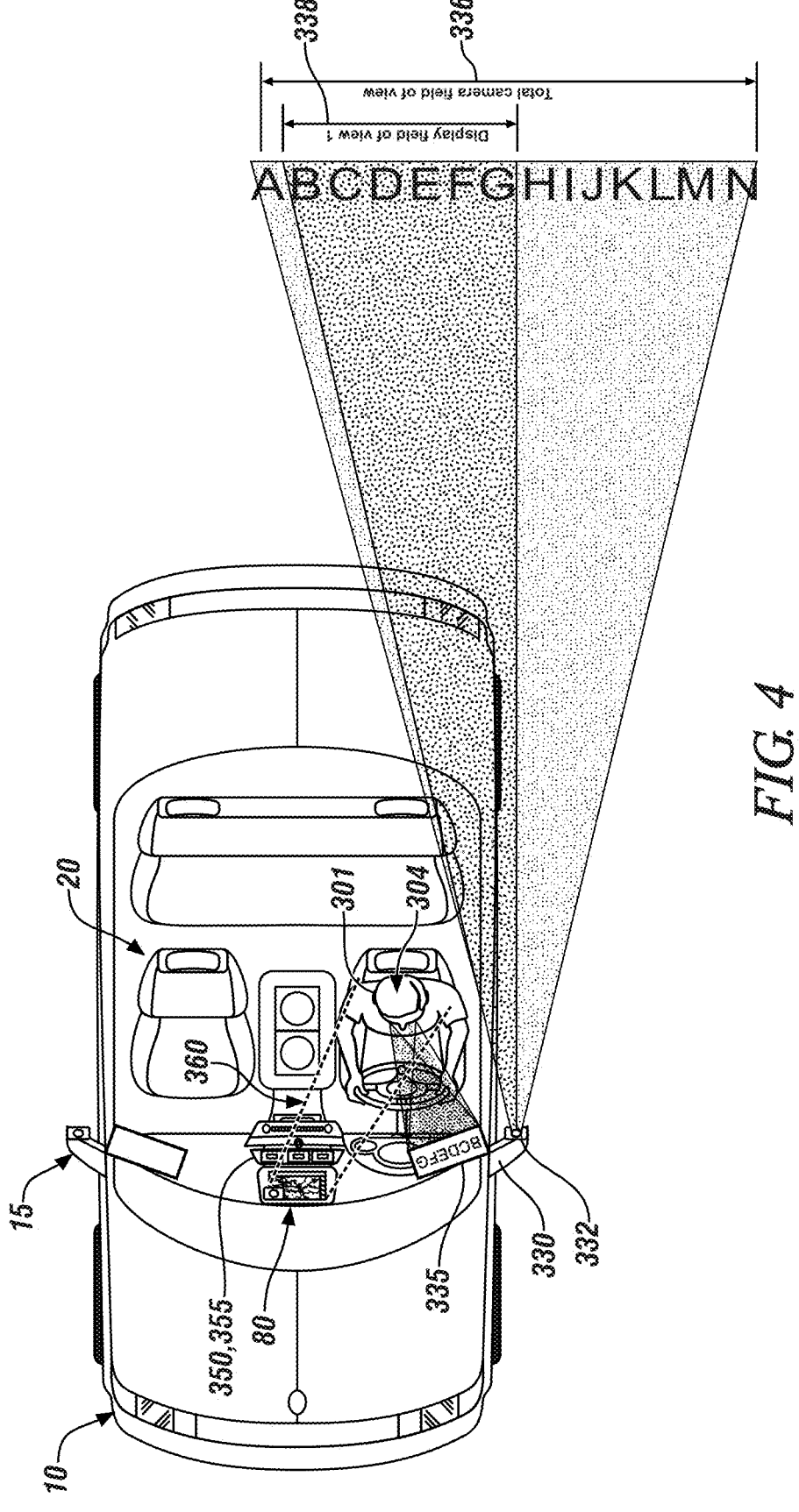
FIG. 4 schematically illustrates a top view of a passenger compartment of a vehicle having an embodiment of a side-view mirror system, in accordance with the disclosure.

FIG. 4 schematically illustrates a top view of a passenger compartment of a vehicle 310 having an embodiment of the side-view mirror system 315, including an operator 301 who is arranged on a left side of the vehicle 310. The vehicle 10 includes, in one embodiment, the passenger cabin 20 with an externally mounted left or operator's-side side-view mirror 330 with first digital camera system 332, an externally mounted right or passenger's-side side-view mirror 340 with second digital camera system 342, a first, leftward display screen 335, a second, rightward display screen 345, an operator information center 350 including a display screen 355, a biometric monitoring system 360, and other elements. In this embodiment, the direction of the operator's eye gaze, as indicated by a second head position 304, is shown as being leftward, which may be interpreted as indicating the operator is in a city traffic situation.

The total FOV 336 for the first digital camera system 332 is shown as having a triangular shape (in 2 dimension), or a pyramidic or conic shape (in 3 dimension), and is depicted to include subregions ABCDEFGHIJKLMN. Based upon the operation of the rearview image generation process 200 described with reference to FIG. 2, a second portion 338 of the total FOV 336 may be selected based upon the operator 301 having the second, leftward head position 304. By way of a non-limiting example, the second portion 338 of the total FOV 336 may be circumscribed to include subregions BCDEFG, with only subregions BCDEFG being displayed on the first, leftward display screen 335, as illustrated.

It is appreciated that the concepts and situations schematically illustrated in FIGS. 3 and 4 may be replicated for the opposite side of the vehicle 310, i.e., the externally mounted right or passenger's-side side-view mirror 340 with second digital camera system 342 and the second, rightward display screen 345 based upon the direction of the eye gaze and associated head position of the operator.

As such, the vehicle system described herein employing the rearview image generation process 200 is executable to recognize hazards and augment threats in a camera image using computer vision algorithms and image selection based on multiple criteria (head-motion, hazard, ROI, etc.) and/or operator preference, and display a portion of the image onto a digital display to assist the operator better understand the side-view environment.

Figure 5:
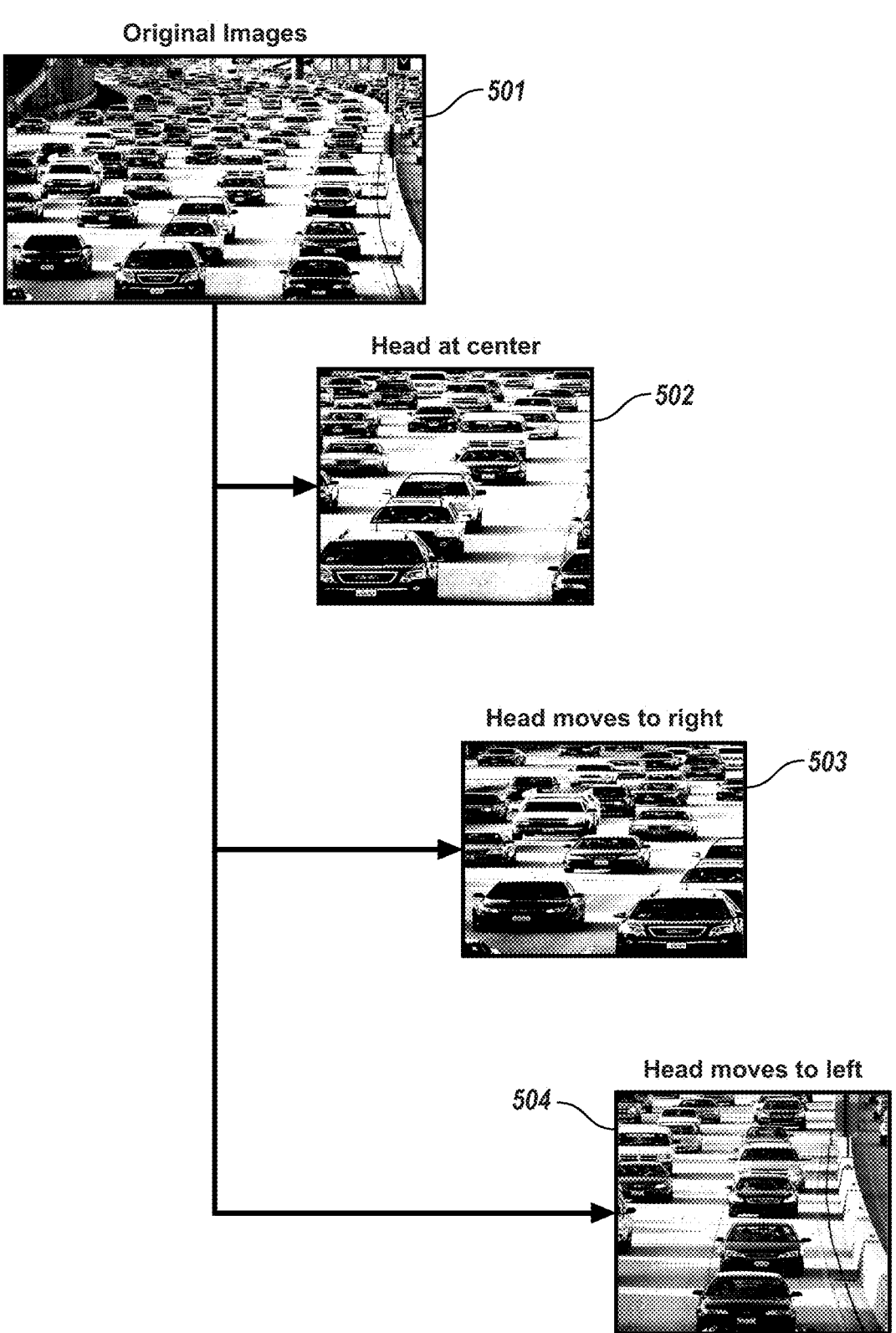
FIG. 5 pictorially illustrates display images for an embodiment of a side-view mirror system including a rearview image generation process, in accordance with the disclosure.

FIG. 5 pictorially illustrates display images for an embodiment of the side-view mirror system 15 that is described with reference to FIG. 1, which are associated with execution of an embodiment of the rearview image generation process 200 that is described with reference to FIGS. 2, 3, and 4.

Element 501 illustrates an original image of a field of view of a rearward area of the vehicle 10 that is captured by one of the first or second digital cameras 32, 42. In this image 501, the subject vehicle is travelling on a multi-lane divided highway, in a travel lane that is second to the right of a median barrier. Depicted lanes include a lane to the left of the travel lane, the travel lane, at least three lanes to the right of the travel lane, and an entrance ramp.

Element 502 illustrates a first partial image, i.e., a portion of the original image 501 of the field of view of the rearward area of the vehicle 10, in which the operator's head is at a nominal center location. The first partial image 502 is generated by the rearview image generation process 200, and primarily includes the travel lane.

Element 503 illustrates a second partial image, i.e., a portion of the original image 501 of the field of view of the rearward area of the vehicle 10, in which the operator's head is at a nominal right of center location. The second partial image 503 is generated by the rearview image generation process 200, and primarily includes the lane to the right of the travel lane.

Element 504 illustrates a third partial image, i.e., a portion of the original image 501 of the field of view of the rearward area of the vehicle 10, in which the operator's head is at a nominal left of center location. The third partial image 504 is generated by the rearview image generation process 200, and primarily includes the lane to the left of the travel lane.

The flowchart and block diagrams therein illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A side-view mirror system for a vehicle, the system comprising:
    a rearview-focused camera, the rearview-focused camera being disposed on a side of a vehicle and being arranged to capture a field of view that is rearward of the vehicle;
    an operator monitoring device, arranged to dynamically determine a direction of an eye gaze of an operator;
    a digital display screen; and
    a controller, in communication with the digital display screen, the rearview camera, and the operator monitoring device;
    wherein the controller includes executable code, the executable code being operative to:
        capture, via the camera, an image of the field of view that is rearward of the vehicle;
        detect, via the operator monitoring device, a present direction of the eye gaze of the operator;
        determine an operating mode, and
        display, via the digital display screen, a portion of the image of the field of view that is rearward of the vehicle, wherein the portion of the image of the field of view is determined based upon the operating mode and the present direction of the eye gaze of the operator.

2. The system of claim 1, wherein the operating mode comprises one of a mirror-like view, a hazard-based view, or a region of interest-based view.

3. The system of claim 2, wherein a displayed portion of the image of the field of view that is determined based upon the operating mode and the present direction of the eye gaze of the operator includes image augmentation having an on-road hazard being highlighted when the hazard-based view is selected.

4. The system of claim 2, wherein a displayed portion of the image of the field of view that is determined based upon the operating mode and the present direction of the eye gaze of the operator includes image augmentation having a region of interest being highlighted when the region of interest-based view is selected.

5. The system of claim 1, wherein the operating mode comprises one of an extended view, an augmented hazard view, or an extended hazard augmented view.

6. The system of claim 1, wherein the controller determines the operating mode based upon an operator preference.

7. The system of claim 1, wherein the operator monitoring device comprises a device arranged to determine a position of a head of the operator to determine the direction of the eye gaze of the operator.

8. The system of claim 1, wherein the rearview-focused camera is disposed on an exterior side surface of the vehicle proximal to a side-view mirror.

9. The system of claim 8, comprising the rearview-focused camera being disposed on a left exterior side surface of the vehicle proximal to a left side-view mirror.

10. The system of claim 8, comprising the rearview-focused camera being disposed on a right exterior side surface of the vehicle proximal to a right side-view mirror.

11. The system of claim 1, wherein the controller determines the operating mode based upon an operator region of interest.

12. The system of claim 1, wherein the controller determines the operating mode based upon presence of a hazard proximal to the vehicle.

13. The system of claim 1, further comprising the controller being operative to execute an image distortion correction of the image of the field of view that is rearward of the vehicle prior to displaying, via the digital display device, the portion of the image of the field of view that is rearward of the vehicle.

14. The system of claim 1, further comprising the controller operative to detect a reverse operation of the vehicle, and display, via the digital display screen, a portion of the image of the field of view that is rearward of the vehicle, wherein the portion of the image of the field of view is determined based upon the operating mode, the present direction of the eye gaze of the operator, and the reverse operation of the vehicle.

15. A side-view mirror system for a vehicle, the system comprising:
    a rearview-focused camera, the rearview-focused camera being disposed on a side of a vehicle and being arranged to capture a field of view that is rearward of the vehicle;
    a passenger compartment, including an operator seat, an operator monitoring device arranged to monitor an operator disposed in the operator seat, and a display screen viewable by the operator; and a controller, in communication with the display device, the rearview camera, and the operator monitoring device;

wherein the controller includes executable code, the executable code being operative to:

capture, via the camera, an image of the field of view that is rearward of the vehicle, detect, via the operator monitoring device, a present direction of an eye gaze of the operator disposed in the operator seat, determine an operating mode, and display, via the display screen, a portion of the image of the field of view that is rearward of the vehicle, wherein the portion of the image of the field of view is determined based upon the operating mode and the present direction of the eye gaze of the operator.

16. The system of claim 15, wherein a displayed portion of the image of the field of view that is determined based upon the operating mode and the present direction of the eye gaze of the operator includes image augmentation having a region of interest being highlighted when the region of interest-based view is selected.

17. The system of claim 15, wherein the operating mode comprises one of an extended view, an augmented hazard view, or an extended hazard augmented view.

18. The system of claim 15, wherein the operator monitoring device comprises a device arranged to determine a position of a head of the operator to determine the direction of the eye gaze of the operator.

19. The system of claim 15, further comprising the controller being operative to execute an image distortion correction of the image of the field of view that is rearward of the vehicle prior to displaying, via the digital display device, the portion of the image of the field of view that is rearward of the vehicle.

20. A side-view mirror system for a vehicle, the system comprising:

a first rearview-focused camera, the first rearview-focused camera being disposed on a left side of a vehicle and being arranged to capture a field of view that is rearward of the left side of the vehicle;

a second rearview-focused camera, the second rearview-focused camera being disposed on a right side of a vehicle and being arranged to capture a field of view that is rearward of the right side of the vehicle;

a passenger compartment, including an operator monitoring device arranged to monitor an operator, and a display screen viewable by the operator; and a controller, in communication with the display screen, the first rearview camera, the second rearview camera, and the operator monitoring device;

wherein the controller includes executable code, the executable code being operative to:

capture, via the first rearview camera, a first image of the field of view that is rearward of the vehicle, capture, via the second rearview camera, a second image of the field of view that is rearward of the vehicle, execute fusion of the first image and the second image;

detect, via the operator monitoring device, a present direction of the eye gaze of the operator disposed in an operator seat, determine an operating mode, and display, via the display screen, a portion of the fusion of the first image and the second image, wherein the portion of the image of the field of view is determined based upon the operating mode and the present direction of the eye gaze of the operator.

* * * * *